United States Patent
Peng et al.

(10) Patent No.: US 8,589,669 B2
(45) Date of Patent: *Nov. 19, 2013

(54) DATA PROTECTING METHOD, MEMORY CONTROLLER AND MEMORY STORAGE DEVICE

(75) Inventors: Yi-Hung Peng, Miaoli (TW); Ching-Hsien Wang, Miaoli County (TW); Chia-Jung Hsu, Yilan County (TW)

(73) Assignee: Phison Electronics Corp., Miaoli (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,403

(22) Filed: Apr. 17, 2012

(65) Prior Publication Data

US 2013/0212368 A1  Aug. 15, 2013

(30) Foreign Application Priority Data

Feb. 10, 2012  (TW) .............................. 101104421 A

(51) Int. Cl.
G06F 9/00 (2006.01)
H04L 29/06 (2006.01)
G06F 21/00 (2013.01)
G06F 11/30 (2006.01)

(52) U.S. Cl.
USPC ................ 713/2; 713/164; 713/183; 713/189

(58) Field of Classification Search
USPC ...................... 713/189, 2, 164, 183
See application file for complete search history.

(56) References Cited

U.S. PATENT DOCUMENTS 7,100,036 B2 * 8/2006 Schwartz .......................... 713/2
2003/0200445 A1 * 10/2003 Park .............................. 713/185

* cited by examiner

Primary Examiner — Mohammad W Reza
(74) Attorney, Agent, or Firm — Jianq Chyun IP Office

(57) ABSTRACT

A data protecting method for a rewritable non-volatile memory module having a first storage area and a second storage area and a memory controller and a memory storage device using the same are provided. The method includes providing default configuration information in response to a boot command from a host system, wherein the host system cannot recognize the second storage area according to the default configuration information. The method also includes requesting the host system to re-boot when a user identification code and a user password receiving from the host system pass an authentication procedure, and providing first configuration information to the host system after re-booting the host system. The host system can recognize the second storage area according to the first configuration information. Accordingly, the method can effectively protect data stored in the rewritable non-volatile memory module.

25 Claims, 10 Drawing Sheets

DATA PROTECTING METHOD, MEMORY CONTROLLER AND MEMORY STORAGE DEVICE

CROSS-REFERENCE TO RELATED APPLICATION

This application claims the priority benefit of Taiwan application serial no. 101104421, filed on Feb. 10, 2012. The entirety of the above-mentioned patent application is hereby incorporated by reference herein and made a part of this specification.

BACKGROUND

1. Technology Field

The present invention relates to a data protecting method, a memory controller using the data protecting method, and a memory storage device using the data protecting method.

2. Description of Related Art

Since a rewritable non-volatile memory is characterized by non-volatility of data, low power consumption, small volume, non-mechanical structure, and fast reading and writing speed, the rewritable non-volatile memory is the most adaptable memory to be applied in a portable electronic product, e.g., a notebook computer. Therefore, the flash memory industry has become a very popular part of the electronic industry in recent years. For instance, a solid state drive (SSD) utilizing a flash memory as its storage medium has been widely applied as a hard drive of a host for ameliorating the access performance of the computer.

When a computer boots up, the basic input output system (BIOS) initializes and identifies system components as well as the connected devices, e.g., a keyboard, a mouse, an optical disc drive, a storage device, and so on. To ensure security of data in the computer (e.g., data stored in the storage device), a user may activate the password protection through the BIOS user interface (UI), so as to prevent another unauthorized user from booting the system and secure access to the BIOS UI functions. However, the unauthorized user is still capable of connecting the storage device to another host with no BIOS password protection, so as to read data stored in the storage device.

In view of the above, it is necessary to propose an effective data protecting method to secure data in a storage device.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

In view of the above, the present invention is directed to a data protecting method capable of effectively protecting data stored in a rewritable non-volatile memory module.

The present invention is further directed to a memory controller capable of effectively protecting data stored in a rewritable non-volatile memory module.

The present invention is further directed to a memory storage device that can effectively protect data stored therein.

According to an exemplary embodiment of the present invention, a data protecting method for a rewritable non-volatile memory module is provided, and the rewritable non-volatile memory module has a first storage area and a second storage area. The data protecting method includes providing default configuration information and pre-boot codes stored in the first storage area in response to a boot command from a host system, wherein the host system is unable to recognize the second storage area according to the default configuration information, and the pre-boot codes are executed in the host system. The data protecting method also includes receiving a user identification code and a user password from the host system and determining whether the user identification code and the user password are respectively identical to a first identification code and a first password. The data protecting method also includes, if the user identification code and the user password are respectively identical to the first identification code and the first password, transmitting a re-boot command to re-boot the host system, and providing first configuration information to the host system after re-booting the host system, wherein the host system recognizes the second storage area according to the first configuration information and accesses data stored in the second storage area.

In an embodiment of the present invention, a memory controller for controlling a rewritable non-volatile memory module is provided. The memory controller includes a host interface, a memory interface, and a memory management circuit. The host interface is configured to couple to a host system. The memory interface is configured to couple to the rewritable non-volatile memory module, wherein the rewritable non-volatile memory module has a first storage area and a second storage area. The memory management circuit is coupled to the host interface and the memory interface and configured to provide default configuration information and pre-boot codes stored in the first storage area in response to a boot command from the host system, wherein the host system is unable to recognize the second storage area according to the default configuration information, and the pre-boot codes are executed in the host system. The memory management circuit is further configured to receive a user identification code and a user password from the host system and determine whether the user identification code and the user password are respectively identical to a first identification code and a first password. If the user identification code and the user password are respectively identical to the first identification code and the first password, the executed pre-boot codes transmit a re-boot command to re-boot the host system, and the memory management circuit provides first configuration information to the host system after re-booting the host system, wherein the host system recognizes the second storage area according to the first configuration information and accesses data stored in the second storage area.

In an embodiment of the present invention, a memory storage device including a connector, a rewritable non-volatile memory module, and a memory controller is provided. The connector is configured to couple to a host system. The rewritable non-volatile memory module has a first storage area and a second storage area. The memory controller is coupled to the connector and the rewritable non-volatile memory module and configured to provide default configuration information and pre-boot codes stored in the first storage area in response to a boot command from the host system, wherein the host system is unable to recognize the second storage area according to the default configuration information, and the pre-boot codes are executed in the host system. The memory controller is further configured to receive a user identification code and a user password from the host system and determine whether the user identification code and the user password are respectively identical to a first identification code and a first password. If the user identification code and the user password are respectively identical to the first identification code and the first password, the executed pre-boot codes transmit a re-boot command to re-boot the host system, and the memory controller provides first configuration information to the host system after re-booting the host system, wherein the host system recognizes the second storage area according to the first configuration information and accesses data stored in the second storage area.

Based on the above, the data protecting method, the memory controller, and the memory storage device described in the exemplary embodiments of the present invention are capable of effectively protecting the data stored therein, so as to prevent unauthorized data access.

It should be understood, however, that this summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF THE EMBODIMENTS

Figure 1:
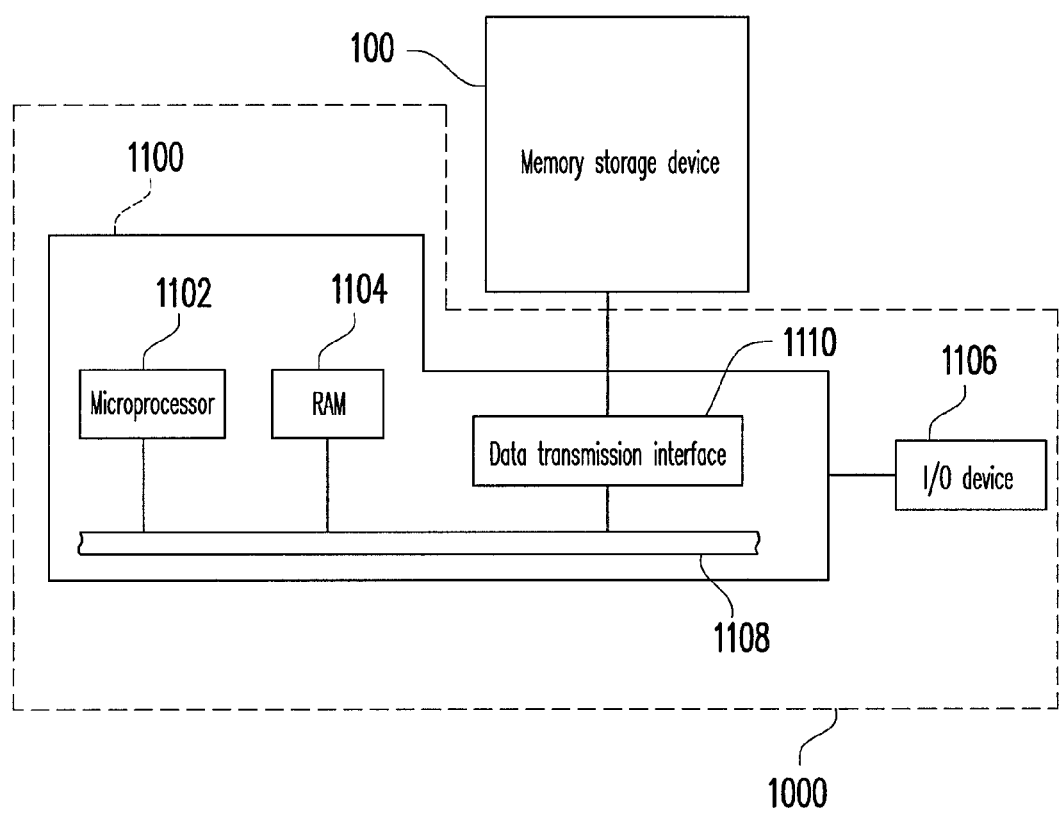
FIG. 1 illustrates a host system and a memory storage device according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

A memory storage device (i.e., a memory storage system) typically includes a rewritable non-volatile memory module and a controller (i.e., a control circuit). The memory storage device is usually used together with a host system, such that the host system can write data into or read data from the memory storage device.

FIG. 1 illustrates a host system and a memory storage device according to a first exemplary embodiment of the present invention.

Figure 2:
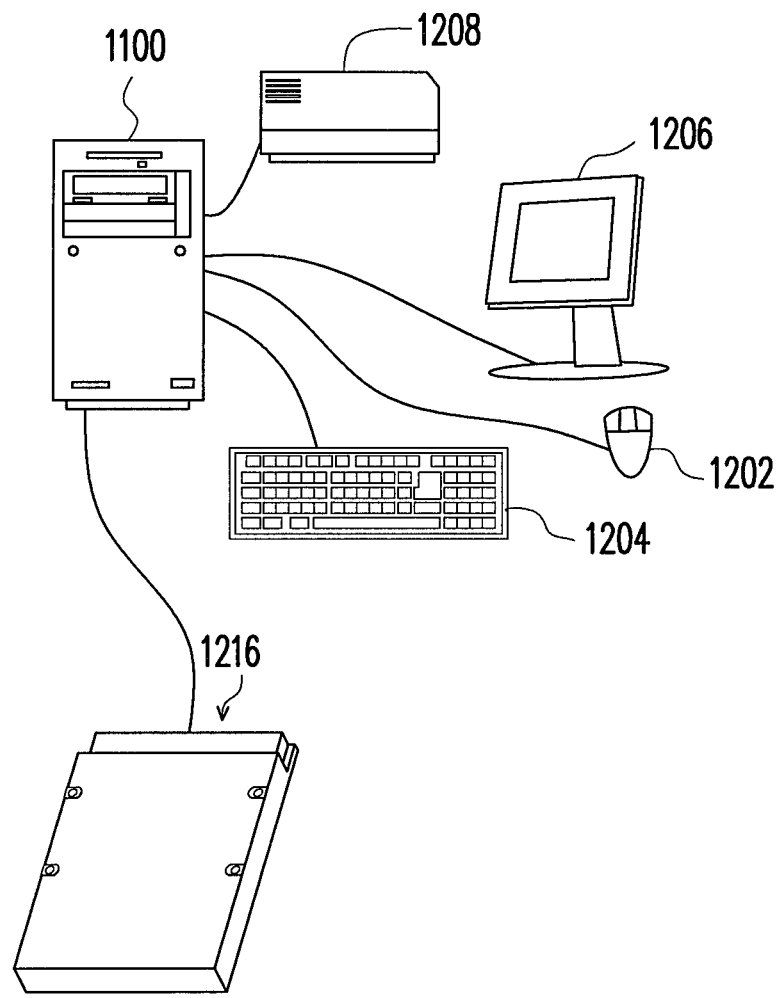
FIG. 2 schematically illustrates a computer, an input/output (I/O) device, and a memory storage device according to the first exemplary embodiment of the present invention

With reference to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 2. It should be understood that the I/O device 1106 is not limited to the devices illustrated in FIG. 2 and may further include other devices.

Figure 3A:
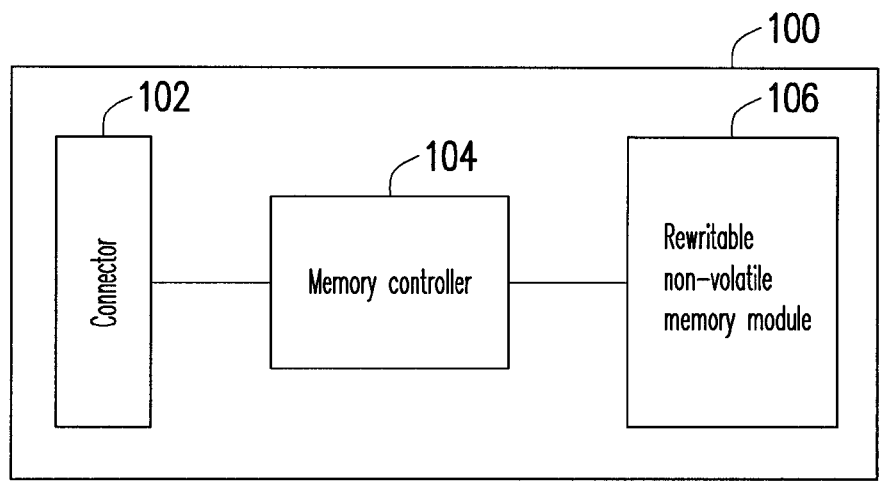
FIG. 3A is a schematic block diagram illustrating the memory storage device depicted in FIG. 2.

In the exemplary embodiment of the present invention, the memory storage device 100 is coupled to other devices of the host system 1000 through the data transmission interface 1110. The data can be written into or read from the memory storage device 100 through the operations of the microprocessor 1102, the RAM 1104, and the I/O device 1106. For instance, the memory storage device 100 may be a solid state drive (SSD) 1216 as shown in FIG. 1B FIG. 3A is a schematic block diagram illustrating the memory storage device depicted in FIG. 2.

With reference to FIG. 3, the memory storage device 100 includes a connector 102, a memory controller 104, and a rewritable non-volatile memory module 106.

In the present exemplary embodiment, the connector 102 complies with a serial advanced technology attachment (SATA) standard. However, the present invention is not limited thereto, and the connector 102 may also comply with the Institute of Electrical and Electronic Engineers (IEEE) 1394 standard, the peripheral component interconnect (PCI) express standard, the parallel advanced technology attachment (PATA) standard, the universal serial bus (USB) standard, the integrated device electronics (IDE) standard, or other suitable standards.

The memory controller 104 is configured for executing a plurality of logic gates or control instructions implemented in a form of hardware or firmware and performing various data operations in the rewritable non-volatile memory module 106 according to commands issued by the host system 1000, such as data writing, reading, erasing, merging, and so on.

The rewritable non-volatile memory module 106 is coupled to the memory controller 104 and has a plurality of physical blocks for storing data written by the host system 1000. According to this exemplary embodiment, each of the physical blocks has a plurality of physical pages, and the physical pages belonging to the same physical block can be written individually and have to be erased simultaneously.

For instance, in this exemplary embodiment, each of the physical blocks is constituted by 128 physical pages, and the capacity of each of the physical pages is 8 KB. Nevertheless, it should be understood that the present invention is not limited thereto, and each of the physical blocks may be constituted by 64 physical pages, 256 physical pages, or any other number of physical pages.

In detail, each of the physical blocks is the smallest unit for erasing data. Namely, each of the physical blocks contains the least number of memory cells that are erased all together. Each of physical pages is the smallest unit for programming data. That is to say, each of the physical pages is the smallest unit for writing data. However, it should be understood that in another exemplary embodiment, the smallest unit for writing data may be one sector or other size. Each physical page usually includes a data bit area and a redundant bit area. The data bit area is used for storing user data, and the redundant bit area is used for storing system data (e.g., error checking and correcting (ECC) codes).

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, other flash memory module or other memory module having the same characteristics.

Figure 3B:
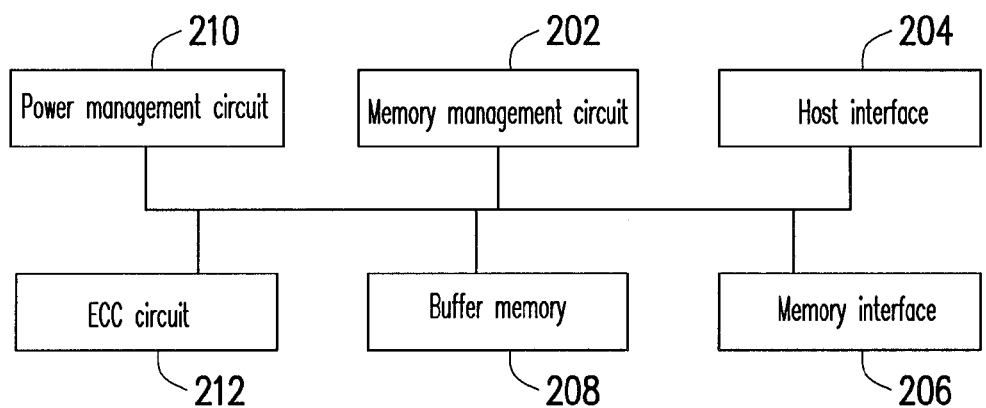
FIG. 3B is a schematic block diagram illustrating a memory controller according to the first exemplary embodiment of the present invention.

FIG. 3B is a schematic block diagram illustrating a memory controller according to the first exemplary embodiment of the present invention.

With reference to FIG. 3B, the memory controller 104 includes a memory management circuit 202, a host interface 204, a memory interface 206, a buffer memory 208, a power management circuit 210, and an error checking and correcting (ECC) circuit 212.

The memory management circuit 202 is configured for controlling the overall operation of the memory controller 104. Particularly, the memory management circuit 202 has a plurality of control instructions, and the control instructions are executed to control the overall operation of the memory controller 104 when the memory storage device 100 is powered on.

In the exemplary embodiment of the present invention, the control instructions of the memory management circuit 202 are stored in a specific area (for instance, the system area of the memory module exclusively used for storing system data) of the rewritable non-volatile memory module 106 as program codes. Additionally, the memory management circuit 202 may have a microprocessor unit (not shown), a read-only memory (ROM, not shown) and a random access memory (RAM, not shown). When the memory controller 104 is enabled, the microprocessor unit loads the control instructions from the rewritable non-volatile memory module 106 into the RAM of the memory management circuit 202. The microprocessor unit then executes the control instructions.

In another exemplary embodiment, the control instructions of the memory management circuit 202 are implemented in a firmware form. For instance, the memory management circuit 202 has a microprocessor unit (not shown) and a ROM (not shown), and the control instructions are burnt into the ROM. When the memory storage device 100 is operated, the control instructions are executed by the microprocessor unit.

Additionally, the control instructions of the memory management circuit 202 may also be implemented in a hardware form according to another exemplary embodiment of the present invention. For instance, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured for managing the physical blocks in the rewritable non-volatile memory module 106. The memory writing unit is configured for giving a write command to the rewritable non-volatile memory module 106, so as to write data into the rewritable non-volatile memory module. The memory reading unit is configured for giving a read command to the rewritable non-volatile memory module 106, so as to read data from the rewritable non-volatile memory module 106. The memory erasing unit is configured for giving an erase command to the rewritable non-volatile memory module 106, so as to erase data from the rewritable non-volatile memory module 106. The data processing unit is configured for processing data to be written into the rewritable non-volatile memory module 106 and data read from the rewritable non-volatile memory module 106.

The host interface 204 is coupled to the memory management circuit 202 and configured for receiving and identifying commands and data transmitted by the host system 1000. Namely, the commands and data transmitted by the host system 1000 are further transmitted to the memory management circuit 202 through the host interface 204. In the present exemplary embodiment, the host interface 204 complies with the SATA standard. However, the present invention is not limited thereto, and the host interface 204 may also comply with the PATA standard, the IEEE 1394 standard, the PCI Express standard, the USB standard, the IDE standard, or any other appropriate data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The buffer memory 208 is coupled to the memory management circuit 202 and configured to temporarily store data and commands received from the host system 1000 or data received from the rewritable non-volatile memory module 106.

The power management circuit 210 is coupled to the memory management circuit 202 and configured for controlling the power of the memory storage device 100.

The ECC circuit 212 is coupled to the memory management circuit 202 and configured for executing an error correcting procedure to ensure data accuracy. Specifically, when the memory management circuit 202 receives a write command from the host system 1000, the ECC circuit 212 generates an error checking and correcting (ECC) code for data (i.e., the updated data) corresponding to the write command, and the memory management circuit 202 writes the updated data and the corresponding ECC code into the rewritable non-volatile memory module 106. Subsequently, when the memory management circuit 202 reads the data from the rewritable non-volatile memory module 106, the memory management circuit 202 simultaneously reads the ECC code corresponding to the read data, and the ECC circuit 212 executes the error correcting procedure for the read data based on the ECC code.

Figure 4A:
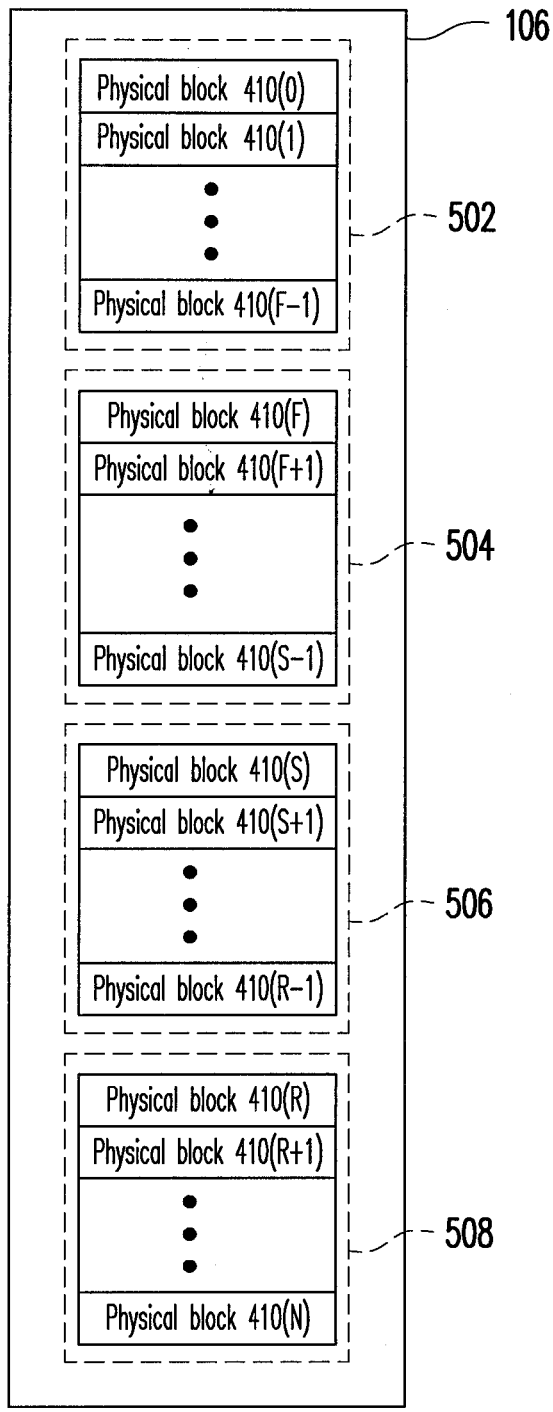
FIG. 4A and FIG. 4B are schematic diagrams of managing physical blocks in a rewritable non-volatile memory module according to the first exemplary embodiment of the present invention.
Figure 4B:
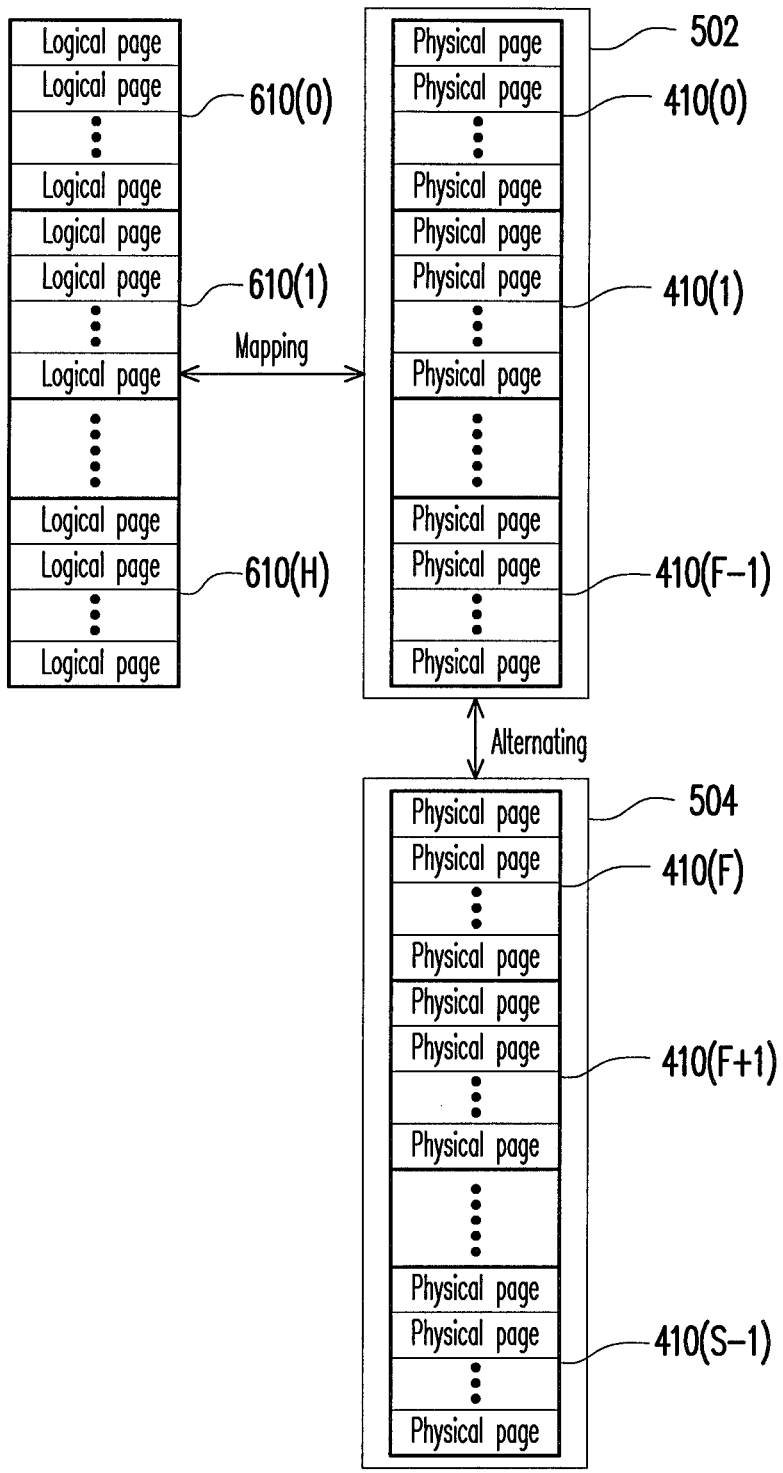

FIG. 4A and FIG. 4B are schematic diagrams of managing physical blocks in a rewritable non-volatile memory module according to the first exemplary embodiment of the present invention.

With reference to FIG. 4A, the rewritable non-volatile memory module 106 has physical blocks 410(0)~410(N), and the memory management circuit 202 of the memory controller 104 logically groups the physical blocks 410(0)~410(N) into (or assigns the physical blocks 410(0)~410(N) as) a data area 502, a spare area 504, a system area 506, and a replacement area 508.

The physical blocks logically belonging to the data area 502 and the spare area 504 are used for storing data from the host system 1000. Specifically, the physical blocks (also referred to as data physical blocks) of the data area 502 are considered physical blocks already containing data, and physical blocks (also referred to as substitute physical blocks) in the spare area 504 are physical blocks used for writing new data. For instance, when a write command and data to be written are received from the host system 1000, the memory management circuit 202 selects a physical block from the spare area 504 as a substitute physical block and writes the data into the selected substitute physical block. In addition, when a data merge operation is to be executed on a logical block, the memory management circuit 202 selects a physical block from the spare area 504 as a new data physical block corresponding to the logical block, writes the data into the new data physical block, and re-maps the logical block to the new data physical block. To be more specific, after the data merge operation is completed, the memory management circuit 202 re-associates (or recycles) the data physical block storing the invalid data or the substitute physical block storing the invalid data with the spare area 504, so as to perform a new data writing operation next time.

The physical blocks logically belonging to the system area 506 are used for recording system data. For instance, the system data includes the manufacturers and models of the rewritable non-volatile memory module, the number of physical blocks in the rewritable non-volatile memory modules, the number of physical pages in each physical block, and so on.

Physical blocks logically belonging to the replacement area 508 are used in a bad physical block replacement procedure for replacing damaged physical blocks. Particularly, if there are still normal physical blocks in the replacement area 508, and a physical block of the data area 502 is damaged, the memory management circuit 202 selects a normal physical block from the replacement area 508 to replace the damaged physical block.

Based on the above, during the operation of the memory storage device 100, the physical blocks associated with the data area 502, the spare area 504, the system area 506, and the replacement area 508 are dynamically changed. For instance, the physical blocks used for alternatively storing data are dynamically associated with the data area 502 or the spare area 504.

It should be mentioned that the memory management circuit 202 in the present exemplary embodiment manages the rewritable non-volatile memory module 106 in units of each physical block. However, the present invention is not limited thereto, and in another exemplary embodiment, the memory management circuit 202 may also group the physical blocks into a plurality of physical units and manage the rewritable non-volatile memory module 106 in units of each physical unit. Each physical unit may be constituted by at least one physical block in the same memory sub-module or in different memory sub-modules, for instance.

As shown in FIG. 4B, the memory management circuit 202 configures logical blocks 610(0)-610(H) for mapping to the physical blocks of the data area 502. Each of the logical blocks has a plurality of logical pages, and the logical pages are sequentially mapped to the physical pages in the corresponding data physical block. For instance, when the memory storage device 100 is formatted, the logical blocks 610(0)-610(H) are initially mapped to the physical blocks 410(0)-410(F−1) of the data area 502.

In the present exemplary embodiment, the memory management circuit 202 maintains a logical block-physical block mapping table to record the mapping relationship between the logical blocks 610(0)-610(H) and the physical blocks of the data area 502. For instance, when the host system 1000 is about to access data in a specific logical access address, the memory management circuit 202 converts the logical access address accessed by the host system 1000 into a multi-dimensional address constituted by corresponding logical blocks and logical pages. Through the logical block-physical block mapping table, the memory management circuit 202 access data in the corresponding physical pages.

Figure 5:
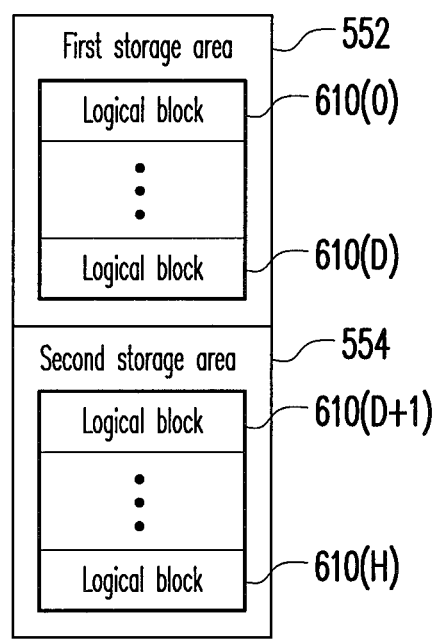
FIG. 5 is a schematic diagram illustrating an example of managing logical blocks according to a first exemplary embodiment of the present invention.

FIG. 5 is a schematic diagram illustrating an example of managing logical blocks according to the first exemplary embodiment of the present invention.

With reference to FIG. 5, the memory management circuit 202 divides the logical blocks 610(0)~610(H) into a first storage area 552 and a second storage area 554. For instance, the logical blocks 610(0)~610(D) belong to the first storage area 552, and the logical blocks 610(D+1)~610(H) belong to the second storage area 554.

The first storage area 552 is used to store application programs developed by a manufacturer producing the memory storage device 100. According to the present embodiment, pre-boot codes are stored in the first storage area 552, and the host system 1000 merely recognize and access the first storage area 552 before the authentication is passed. The first storage area 552 described herein is also referred to as a pre-boot area 552. To be specific, as long as the host system 1000 is activated, the BIOS of the host system 1000 identifies the memory storage device 100 through a handshaking procedure. During the handshaking procedure, the memory management circuit 202 transmits default configuration information and the pre-boot code stored in the first storage area 552 to the host system 1000. Thereby, the host system 1000 is able to identify the configurations of the memory storage device 100 according to the default configuration information received from the memory management circuit 202. For instance, through the received default configuration information, the host system 1000 is informed that the memory storage device 100 is a mass storage device and the capacity of the memory storage device 100 is the capacity of the logical blocks 610(0)~610(D). Particularly, according to the default configuration information, the host system 1000 is able to recognize the first storage area 552 but is unable to recognize the second storage area 554. Namely, according to the default configuration information, the host system 1000 merely maps the logical access addresses to the logical blocks 610(0)~610(D) to access data stored in the first storage area 552 (e.g., execute the pre-boot code stored in the first storage area 552), but the host system 1000 is not informed that the memory storage device 100 has the second storage area 554. In the present exemplary embodiment, when the pre-boot codes are executed by the host system 1000, the password authentication program included in the pre-boot codes is executed, so as to require the user of the host system 1000 to input a user identification code and a user password for identify authentication. The detailed password authentication mechanism will be elaborated hereinafter with reference to the drawings. According to the present exemplary embodiment, the memory management circuit 202 initially sets the storage mode of the first storage area 552 as the read-only mode, so as to prevent the user from erroneously deleting data or programs stored in the first storage area 552. However, the present invention is not limited thereto, and the storage mode of the first storage area 552 may also be set as the readable and writable mode.

Besides, in an exemplary embodiment of the invention, the data stored in the first storage area 552 may be encrypted with a default boot key, and the memory management circuit 202 decrypts the data (i.e., the encrypted pre-boot code) read from the first storage area 552 with the default boot key before the password is authenticated. For instance, the default boot key is stored in the read-only memory (not shown) of the memory controller 104.

The second storage area 554 is a partition provided for a user to store data. Specifically, in the exemplary embodiment of the present invention, after the password is authenticated, the memory management circuit 202 sets the second storage area 554 as a storage area that can be accessed by the host system 1000. To be specific, when the host system 1000 identifies the memory storage device 100 according to the default configuration information and executes the pre-boot codes transmitted by the memory storage device 100, the password authentication procedure is activated. After the host system 1000 passes the password authentication procedure, the password authentication program 602 included in the pre-boot codes transmits a re-boot command to the host system 1000. Particularly, when the host system 1000 re-boots BIOS to perform the handshaking procedure with the memory storage device 100, the memory management circuit 202 transmits new configuration information (hereinafter "the first configuration information") to the host system 1000. Besides, according to the first configuration information, the host system 1000 is informed that the capacity of the memory storage device 100 is the capacity of the logical blocks 610 (D+1)~610(H). For instance, the host system 1000 maps the logical access addresses to the logical blocks 610(D+1)~610(H) according to the first configuration information, and thereby the host system 1000 recognizes the second storage area 554 and accesses data in the second storage area 554.

The memory management circuit 202, for instance, stores a flag in the buffer memory 208 and recognizes whether the host system 1000 passes the password authentication procedure according to the flag in the handshaking procedure. To be specific, during the host system 1000 is re-booted according to the re-boot command, the memory storage device 100 is still in operation. Hence, the flag stored in the buffer memory 208 is not lost, and the memory management circuit 202 is able to confirm that the host system 1000 passes the password authentication procedure. In more details, if the host system 1000 is shut down and then re-booted, the flag stored in the buffer memory 208 is lost because the memory storage device 100 is at a non-operation state after being shut down. Besides, after the host system 1000 is shut down and then re-booted, the password authentication program 602 included in the pre-boot codes again requires the host system 1000 to perform the password authentication procedure.

It should be understood that the memory management circuit 202 in the present exemplary embodiment manages the logical blocks in unit of two partitions. Nevertheless, the present invention is not limited thereto. According to another exemplary embodiment of the present invention, the memory management circuit 202 may manage the logical blocks in unit of more storage areas.

Figure 6:
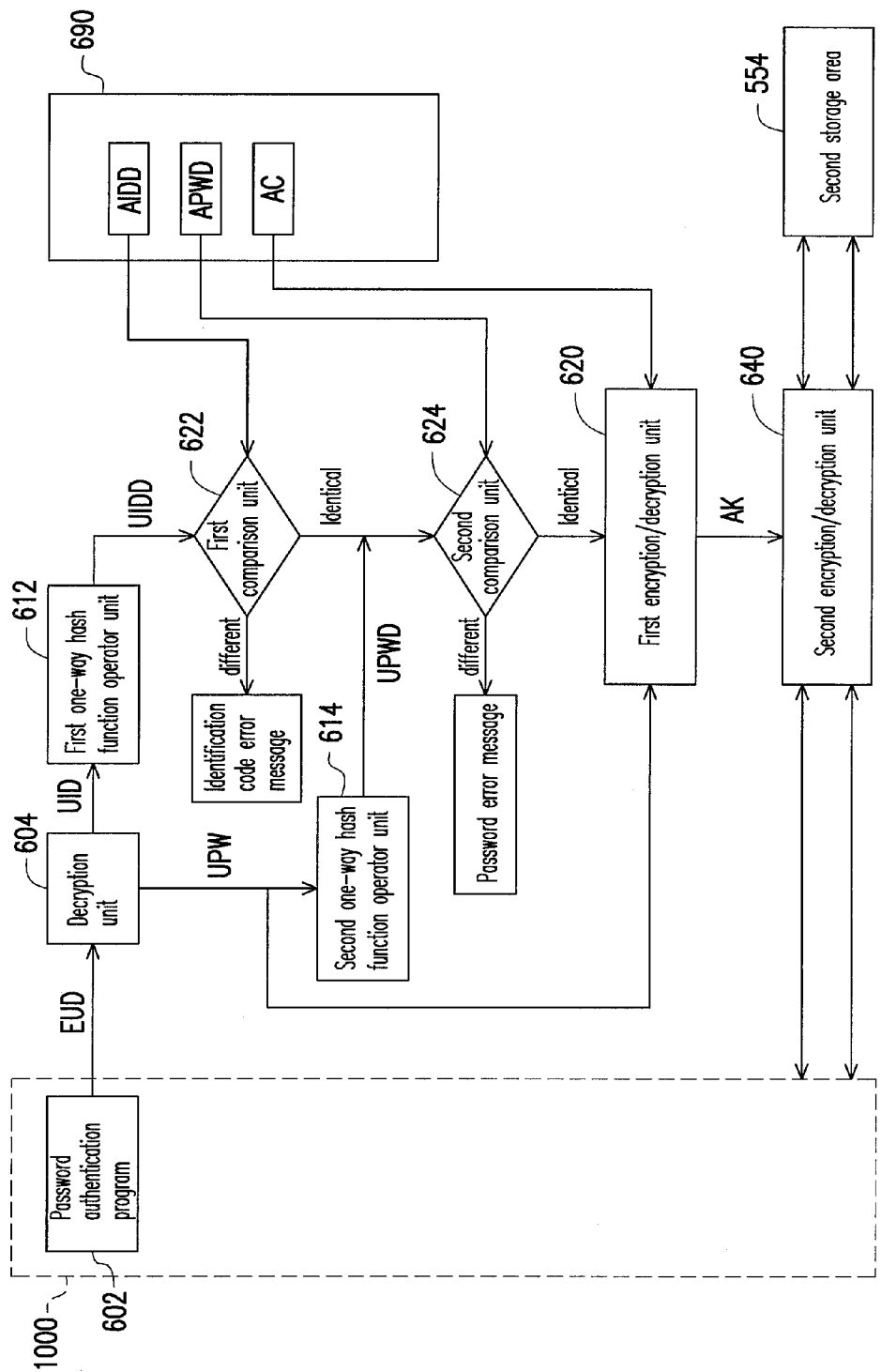
FIG. 6 is a schematic diagram illustrating executing a password authentication procedure according to the first exemplary embodiment of the present invention.

FIG. 6 is a schematic diagram illustrating executing the password authentication procedure according to the first exemplary embodiment of the invention.

With reference to FIG. 6, as stated above, the host system 1000 cannot access the second storage area 554 unless it passes the password authentication procedure. For instance, in the process of manufacturing the memory storage device 100, a set of default user identification code and default user password is initially generated, and the default user identification code and default user password are encoded and stored in a secured area 690. Besides, the user of the host system 1000 may complete the password authentication procedure by inputting the default user identification code and the default user password, and the user then re-sets a user identification code and a user password through the interface of the password authentication program 602 executed in the host system 1000.

In particular, the default user identification code or a user identification code (hereinafter "the first identification code") reset by the user is encoded by a first one-way hash function operator unit 612, so as to generate a first identification code digest AIDD, and the first identification code digest AIDD is stored in the secured area 690. Additionally, the default user password or a user password (hereinafter "the first password") reset by the user is encoded by a second one-way hash function operator unit 614, so as to generate a first password digest APWD, and the first password digest APWD is stored in the secured area 690. In the present exemplary embodiment, the first one-way hash function operator unit 612 is implemented according to a first one-way hash function, and the second one-way hash function operator unit 614 is implemented according to a second one-way hash function. The first one-way hash function and the second one-way hash function are SHA-512. However, it should be understood that the invention is not limited thereto, and in another exemplary embodiment the first one-way hash function and the second one-way hash function may be MD5, RIPEMD-160, SHA1, SHA-386, SHA-256, or any other appropriate function. Moreover, in another exemplary embodiment of the present invention, the first one-way hash function operator unit 612 and the second one-way hash function operator unit 614 may be implemented according to different one-way hash functions.

It should be mentioned that, in the present exemplary embodiment, the first password is applied to encrypt a first key AK through a first encrypting/decryption unit 620, so as to generate a first ciphertext AC, and the first ciphertext AC is stored in the secured area 690. Here, the first key is used for encrypting the data to be stored in the second storage area 554 and decrypting the data read from the second storage area 554.

According to the present exemplary embodiment, the first encrypting/decryption unit 620 is implemented with the advanced encryption standard (AES), whereas the present invention is not limited thereto. For instance, the first encrypting/decryption unit 620 may also be implemented with the data encryption standard (DES).

In this exemplary embodiment, the secured area 690 may be disposed in the rewritable non-volatile memory module 106. For instance, the memory management circuit 202 may assign parts of the physical blocks of the rewritable non-volatile memory module 106 as the secured area 690 or assign parts of the storage space in the system area 506 as the secured area 690. Alternatively, an additional non-volatile memory module may be disposed in the memory controller 104 as the secured area 690.

After the host system 1000 receives the default configuration information and executes the password authentication programs 602 in the pre-boot code, the password authentication programs 602 displays the input interface on the output device of the host system 1000, so as to require the user to input the user identification code and the user password. The input interface includes an identification code field and a password field for the user to input relevant information, for instance. The password authentication program 602 then encrypts the received user identification code UID and the received user password UPW to generate the encrypted user identification information EUD and transmits the encrypted user identification information EUD to the memory storage device 100. In the present exemplary embodiment, for instance, the password authentication program 602 uses the identification code of the memory controller 104 as the encryption key and encrypts the user identification code UID and the user password UPW through the AES, which should however not be limited in the present invention. For instance, the user identification code UID and the user password UPW may also be encrypted through the DES.

After receiving the encrypted user identification information EUD, the memory management circuit 202 decrypts the received encrypted user identification information EUD, so as to obtain the user identification code UID and the user password UPW. For instance, the memory management circuit 202 may, through a decryption unit 604, decrypt the encrypted user identification information EUD with the identification code of the memory controller 104. Herein, decryption unit 604 is implemented with the AES applied to the password authentication program 602.

The memory management circuit 202 then encodes the user identification code UID through the first one-way hash function operator unit 612, so as to obtain the user identification code digest UIDD. Besides, the memory management circuit 202 encodes the user password UPW through the second one-way hash function operator unit 614, so as to obtain the user password digest UPWD.

In the present exemplary embodiment, the memory management circuit 202 reads the first identification code digest AIDD from the secured area 690 and determines whether the user identification code digest UIDD is identical to the first identification code digest AIDD through a first comparison unit 622. If the user identification code digest UIDD is different from the read first identification code digest AIDD, the memory management circuit 202 outputs an identification code error message to the host system 1000.

If the user identification code digest UIDD is identical to the read first identification code digest AIDD, the memory management circuit 202 reads the first password digest APWD from the secured area 690 and determines whether the user password digest UPWD is identical to the first password digest APWD through a second comparison unit 624. If the user password digest UPWD is different from the read first password digest APWD, the memory management circuit 202 outputs a password error message to the host system 1000.

If the user password digest UPWD is identical to the read first password digest APWD, the memory management circuit 202 decrypts the first ciphertext AC with the user password UPW through the first encryption/decryption unit 620, so as to obtain the first key AK, and the password authentication program 602 included in the pre-boot codes transmits the re-boot command for re-booting the host system 1000.

After the host system 1000 is re-booted, the memory management circuit 202 transmits the first configuration information to the host system 1000, such that the host system 1000 may access data in the second storage area 554 according to the first configuration information. According to the present exemplary embodiment, the host system 1000 cannot access the second storage area 554 unless it passes the password authentication procedure, and thereby data security can be ensured. In addition, according to the present exemplary embodiment, before the data is written into the second storage area 554, the memory management circuit 202 may encrypts data with the first key AK through a second encryption/decryption unit 640, and the memory management circuit 202 may decrypts the data with the first key AK through the second encryption/decryption unit 640 before transmitting the data read from the second storage area 554 to the host system 1000. It should be understood that the second storage area 554 cannot be accessed unless the password is authenticated according to the present exemplary embodiment, so as to protect data. The mechanism of encrypting/decrypting the data by using the first key AK may further guarantee data security. However, the present invention is not limited thereto. That is to say, in another exemplary embodiment, the first encrypting/decryption unit 620, the second encrypting/decryption unit 640, the function of generating the first ciphertext AC, and the function of storing the first ciphertext AC into the secured area 690 may be omitted.

Figure 7:
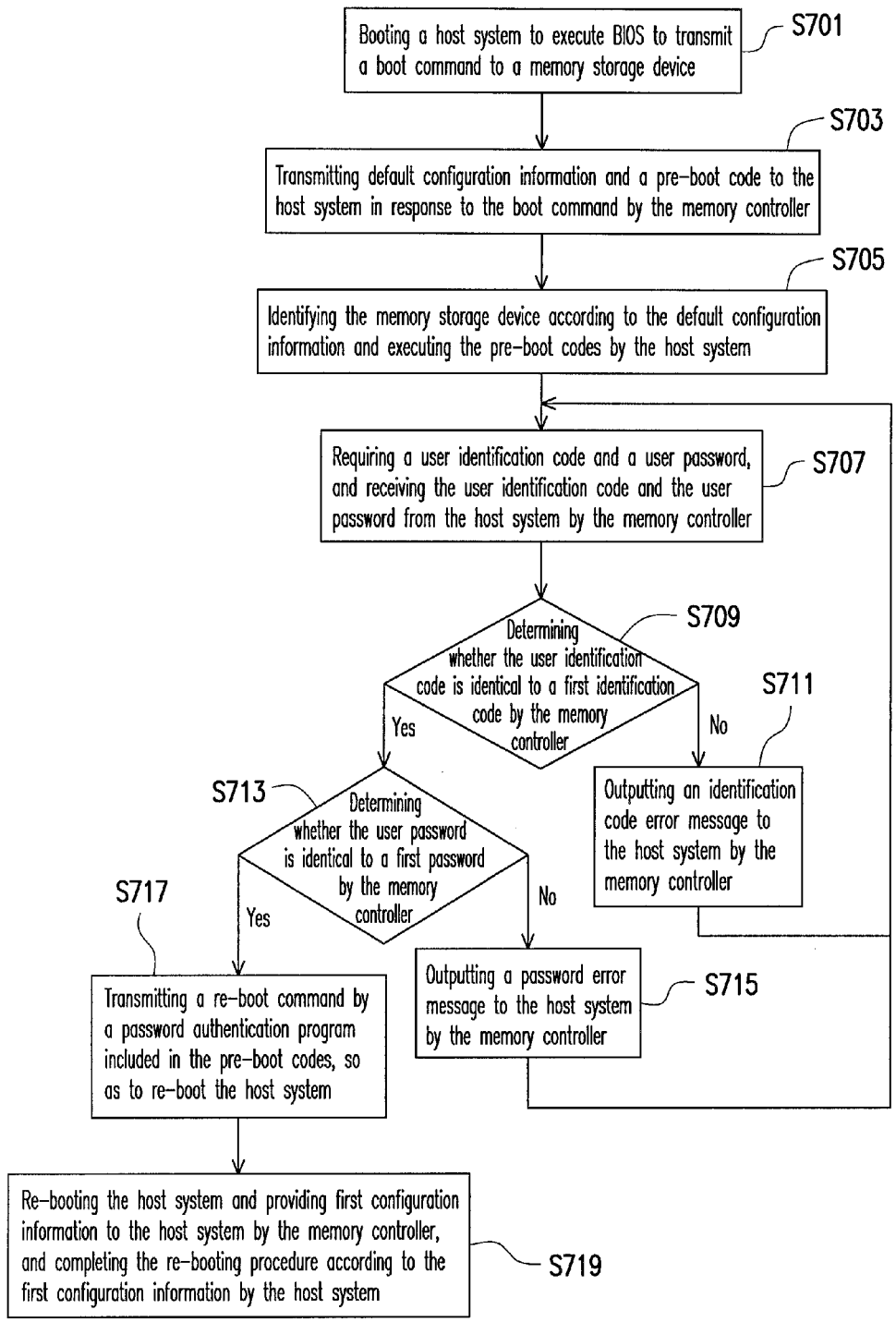
FIG. 7 is a flowchart illustrating a data protecting method according to the first exemplary embodiment of the present invention.

FIG. 7 is a flowchart illustrating a data protecting method according to the first exemplary embodiment of the present invention.

With reference to FIG. 7, in step S701, the host system 1000 is booted to execute BIOS, and BIOS transmits the initialization command (i.e., the boot command) to the memory storage device 100. After that, in step S703, the memory controller 104 transmits the default configuration information and the pre-boot code to the host system 1000 in response to the boot command. Specifically, as described above, according to the default configuration information, the host system 1000 maps the logical access addresses to the logical blocks of the first storage area 552, while the host system 1000 is unable to recognize the second storage area 554.

In step S705, the host system 1000 identifies the memory storage device 100 according to the default configuration information and executes the pre-boot codes, and in step S707, the user is required to input a user identification code and a user password, and the memory controller 104 receives the user identification code and the user password from the host system 1000. For instance, in step S707, the password authentication program 602 encrypts the user identification code and the user password and transmits the encrypted user identification code and the encrypted user password to the memory controller 104.

In step S709, the memory controller 104 determines whether the user identification code is identical to the first identification code. Particularly, in step S709, the memory controller 104 determines whether the user identification code is identical to the first identification code by comparing the user identification code digest corresponding to the user identification code with the first identification code digest stored in the secured area 690. The mechanism of determining whether the user identification code is identical to the first identification code is described above with reference to FIG. 6 and thus will not be further discussed hereinafter.

If the user identification code is different from the first identification code, the memory controller 104 in step S711 outputs an identification code error message to the host system 1000, and step S707 is performed.

If the user identification code is identical to the first identification code, in step S713, the memory controller 104 determines whether the user password is identical to the first password. Similarly, in step S713, the memory controller 104 determines whether the user password is identical to the first password by comparing the user password digest corresponding to the user password with the first password digest stored in the secured area 690. The mechanism of determining whether the user password is identical to the first password is described above with reference to FIG. 6 and thus will not be further discussed hereinafter.

If the user password is different from the first password, the memory controller 104 in step S715 outputs a password error message to the host system 1000, and step S707 is performed.

By contrast, if the user password is identical to the first password, in step S717, the password authentication program 602 included in the pre-boot codes transmits a re-boot command to re-boot the host system 1000. In step S719, the host system 1000 is re-booted, the memory controller 104 provides the first configuration information to the host system 1000, and the host system 1000 completes the re-booting procedure according to the first configuration information. Specifically, as described above, according to the first configuration information, the host system 1000 maps the logical access addresses to the logical blocks of the second storage area 554.

According to an exemplary embodiment, it should be mentioned that when the user password is identical to the first password, the memory controller 104 further decrypts the first ciphertext stored in the secured area 690 with the user password, so as to obtain the first key, and the memory controller 104 encrypts the data to be stored into the second storage area 554 and decrypts the data read from the second storage area 554 with the first key.

[Second Exemplary Embodiment]

The difference between the second embodiment and the first embodiment lies in that the logical blocks in the second embodiment are assigned as a plurality of storage areas for different users, and the memory storage device in the second embodiment allows the host system to access the corresponding storage area according to the user identification code and the user password transmitted by the host system 1000. Hardware components of the second exemplary embodiment are substantially similar to that disclosed in the first exemplary embodiment, and components described in the first exemplary embodiment are applied to differentiate the first exemplary embodiment from the second exemplary embodiment.

In the second exemplary embodiment, the logical blocks 610(0)~610(H) mapped to the physical blocks of the data area 502 may be assigned as the storage areas for different users according to requirements of the administrator of the host system. Configurations suitable for two users are described hereinafter according to the second exemplary embodiment, and it should be understood that the invention is not limited thereto.

Figure 8:
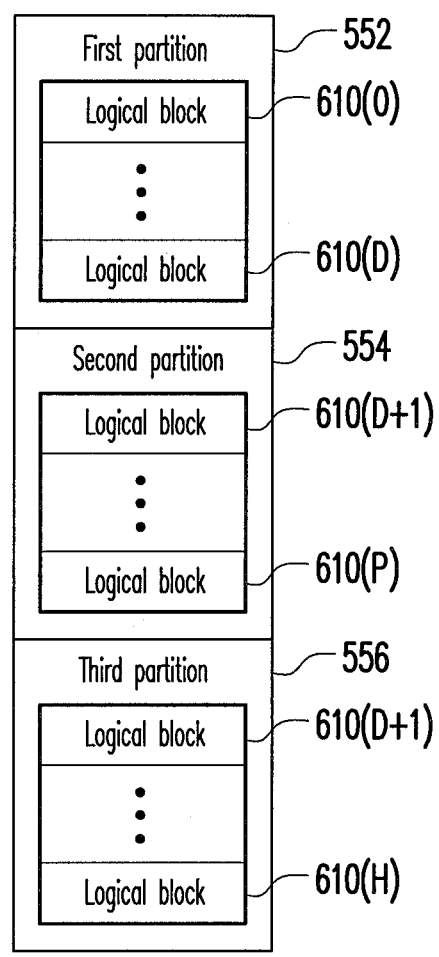
FIG. 8 is a schematic diagram illustrating an example of managing logical blocks according to a second exemplary embodiment of the present invention.

FIG. 8 is a schematic diagram illustrating an example of managing logical blocks according to a second exemplary embodiment of the present invention.

With reference to FIG. 8, the memory management circuit 202 assigns logical blocks 610(0)~610(H) as a first storage area 552, a second storage area 554, and a third storage area 556. For instance, the logical blocks 610(0)~610(D) belong to the first storage area 552, the logical blocks 610(D+1)~610(P) belong to the second storage area 554, and the logical blocks 610(P+1)~610(H) belong to the third storage area 556.

As described in the first exemplary embodiment, the first storage area 552 is used for storing the pre-boot codes of the memory storage device 100. The second storage area 554 is a partition assigned to a first user for storing data, and the third storage area 556 is a partition assigned to a second user for storing data. In this exemplary embodiment, after the user identification code and the user password of the first user are authenticated, the memory management circuit 202 sets the second storage area 554 as a storage area capable of being accessed by the host system 1000; and after the user identification code and the user password of the second user are authenticated, the memory management circuit 202 sets the third storage area 556 as a storage area capable of being accessed by the host system 1000.

Specifically, when the host system 1000 identifies the memory storage device 100 according to the default configuration information, the host system 1000 is capable of accessing the first storage area 552 but is incapable of recognizing the second and third storage areas 554 and 556. Namely, according to the default configuration information, the host system 1000 maps the logical access addresses to the logical blocks 610(0)~610(D) to access data stored in the first storage area 552, but the host system 1000 is not informed that the memory storage device 100 has the second and third storage areas 554 and 556.

During the password authentication procedure, if the identification code and the password transmitted by the host system 1000 correspond to the user identification code and the user password of the first user, the password authentication program 602 included in the pre-boot codes transmits a re-boot command to the host system 1000. When the host system 1000 re-boots BIOS to perform the handshaking procedure with the memory storage device 100, the memory management circuit 202 of memory controller 104 transmits the first configuration information to the host system 1000. According to the first configuration information, the host system 1000 is informed that the capacity of the memory storage device 100 is the capacity of the logical blocks 610(D+1)~610(P), and the host system 1000 maps the logical access addresses to the logical blocks 610(D+1)~610(P), so as to recognize the second storage area 554 and access data in the second storage area 554.

During the password authentication procedure, if the identification code and the password transmitted by the host system 1000 correspond to the user identification code and the user password of the second user, the password authentication program 602 included in the pre-boot code transmits a re-boot command to the host system 1000. When the host system 1000 re-boots BIOS to perform the handshaking procedure with the memory storage device 100, the memory management circuit 202 of memory controller 104 transmits the second configuration information to the host system 1000. According to the second configuration information, the host system 1000 is informed that the capacity of the memory storage device 100 is the capacity of the logical blocks 610(P+1)~610(H), and the host system 1000 maps the logical access addresses to the logical blocks 610(P+1)~610(H), so as to recognize the third storage area 556 and access data in the third storage area 556.

Based on the above, in the second exemplary embodiment, the memory management circuit 202 of memory controller 104 transmits different configuration information to the host system 1000 according to different users, and therefore the digests corresponding to the user identification codes and the user passwords of different users are stored in the secured area 690. For instance, the secured area 690 stores the identification code digest (hereinafter the first identification code digest) corresponding to the first identification code set by the first user or configured for the first user as well as the password digest (hereinafter the first password digest) corresponding to the first password set by the first user or configured for the first user. For instance, the first identification code digest is generated by the first one-way hash function operator unit 612 that encodes the first identification code, and the first password digest is generated by the second hash function operator unit 614 that encodes the first password. Besides, the secured area 690 stores the identification code digest (hereinafter the second identification code digest) corresponding to the second identification code set by the second user or configured for the second user as well as the password digest (hereinafter the second password digest) corresponding to the second password set by the second user or configured for the second user. For instance, the second identification code digest is generated by the first one-way hash function operator unit 612 that encodes the second identification code, and the second password digest is generated by the second hash function operator unit 614 that encodes the second password. Thereby, the memory management circuit 202 of memory controller 104 may identify the user of the host system 1000 according to the data recorded in the secured area 690.

It should be mentioned that, in the present exemplary embodiment, the secured area 690 further stores the first ciphertext generated by encrypting the first key with the first password as well as the second ciphertext generated by encrypting the second key with the second password. Herein, the first key is used for encrypting the data to be stored in the second storage area 554, and the second key is used for encrypting the data to be stored in the third storage area 556.

Figure 9:
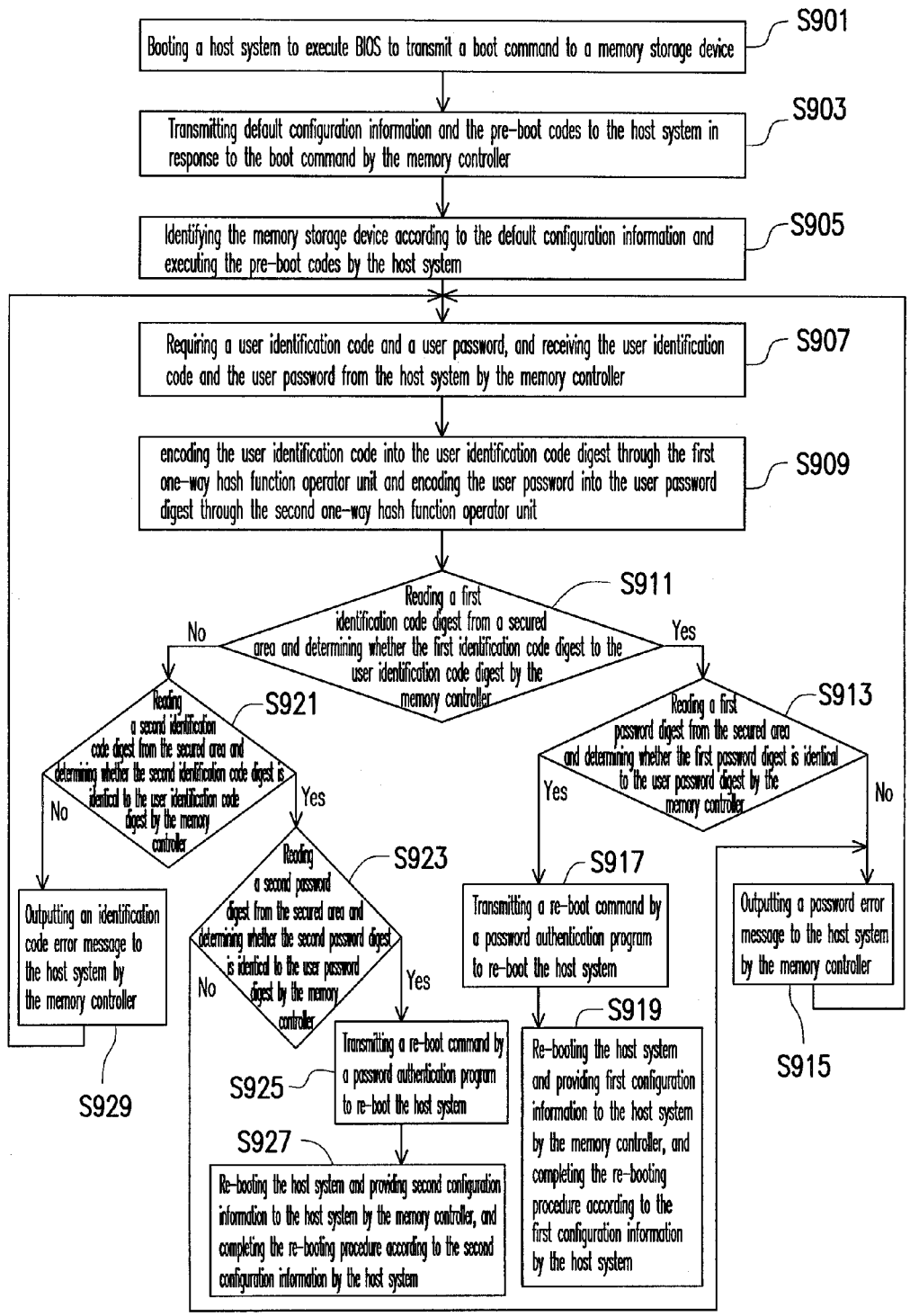
FIG. 9 is a flowchart illustrating a data protecting method according to the second exemplary embodiment of the present invention.

FIG. 9 is a flowchart illustrating a data protecting method according to the second exemplary embodiment of the present invention.

With reference to FIG. 9, in step S901, the host system 1000 is booted to execute BIOS, and BIOS transmits the initialization command (i.e., the boot command) to the memory storage device 100. After that, in step S903, the memory controller 104 transmits the default configuration information and the pre-boot codes to the host system 1000 in response to the boot command. Specifically, as described above, according to the default configuration information, the host system 1000 maps the logical access addresses to the logical blocks of the first storage area 552, while the host system 1000 is unable to recognize the second and third storage areas 554 and 556.

In step S905, the host system 1000 identifies the memory storage device 100 according to the default configuration information and executes the pre-boot code, and in step S907, the user is required to input a user identification code and a user password, and the memory controller 104 receives the user identification code and the user password from the host system 1000. For instance, the password authentication program 602 encrypts the input user identification code and the input user password to generate the encrypted user identification information and transmits the encrypted user identification information to the memory storage device 100. Besides, the memory controller 104 decrypts the received encrypted user identification information with use of the decryption unit 604, so as to obtain the user identification code and the user password.

In step S909, the memory controller 104 encodes the user identification code into the user identification code digest through the first one-way hash function operator unit 612 and encodes the user password into the user password digest through the second one-way hash function operator unit 614.

In step S911, the memory controller 104 reads the first identification code digest from the secured area 690 and determines whether the first identification code digest is identical to the user identification code digest. For instance, the memory management circuit 202 of memory controller 104 determines whether the first identification code digest is identical to the user identification code digest through the first comparison unit 622.

If the user identification code digest is identical to the first identification code digest, in step S913, the memory controller 104 reads the first password digest from the secured area 690 and determines whether the first password digest is identical to the user password digest. For instance, the memory management circuit 202 determines whether the first password digest is identical to the user password digest through the second comparison unit 624.

If the first password digest is different from the user password digest, in step S915, the memory controller 104 outputs a password error message to the host system 1000, and step S907 is performed.

By contrast, if the first password digest is identical to the user password digest, in step S917, the password authentication program 602 included in the pre-boot code transmits a re-boot command to re-boot the host system 1000. In step S919, the host system 1000 is re-booted, the memory controller 104 provides first configuration information to the host system 1000, and the host system 1000 completes the re-booting process according to the first configuration information. As described above, according to the first configuration information, the host system 1000 maps the logical access addresses to the logical blocks of the second storage area 554. Particularly, in the example of data in the second storage area is encrypted by the first key, the memory management circuit 202 of the memory controller 104 decrypts the first ciphertext stored in the secured area 690 with the user password, so as to obtain the first key, and the memory management circuit 202 of the memory controller 104 encrypts the data to be stored into the second storage area 554 and decrypts the data read from the second storage area 554 with the first key. For instance, the memory management circuit 202 of the memory controller 104 decrypts the first ciphertext through the first encrypting/decryption unit 620 to obtain the first key, and the memory management circuit 202 of the memory controller 104 encrypts/decrypts data accessed from the second storage area 554 through the second encrypting/decryption unit 640.

In step S911, if the first identification code digest is different from the user identification code digest, in step S921, the memory controller 104 reads the second identification code digest from the secured area 690 and determines whether the second identification code digest is identical to the user identification code digest. For instance, the memory management circuit 202 of the memory controller 104 determines whether the second identification code digest is identical to the user identification code digest through the first comparison unit 622.

If the second identification code digest is identical to the user identification code digest, in step S923, the memory controller 104 reads the second password digest from the secured area 690 and determines whether the second password digest is identical to the user password digest. For instance, the memory management circuit 202 of the memory controller 104 determines whether the second password digest is identical to the user password digest through the second comparison unit 624.

If the second password digest is different from the user password digest, step S915 is performed.

By contrast, if the second password digest is identical to the user password digest, in step S925, the password authentication program 602 included in the pre-boot codes transmits a re-boot command to re-boot the host system 1000. In step S927, the host system 1000 is re-booted, the memory controller 104 provides second configuration information to the host system 1000, and the host system 1000 completes the re-booting process according to the second configuration information. As described above, according to the second configuration information, the host system 1000 maps the logical access addresses to the logical blocks of the third storage area 556. Particularly, in the example of data in the third storage area is encrypted with the second key, the memory management circuit 202 of the memory controller 104 decrypts the second ciphertext stored in the secured area 690 with the user password, so as to obtain the second key, and the memory management circuit 202 of the memory controller 104 encrypts the data to be stored into the third storage area 556 and decrypts the data read from the third storage area 556 with the second key. For instance, the memory management circuit 202 of the memory controller 104 decrypts the second ciphertext through the first encrypting/decryption unit 620 to obtain the second key, and the memory management circuit 202 of the memory controller 104 encrypts/decrypts data accessed from the third storage area 556 through the second encrypting/decryption unit 640.

if it is determined that the second identification code digest is different from the user identification code digest in step S921, the memory controller 104 outputs an identification code error message to the host system 1000 (S929), and step S907 is performed.

In view of the above, according to the memory storage device, the memory controller, and the data protecting method described in an exemplary embodiment of the invention, when the host system is being booted, only the boot storage area can be identified, and the pre-boot mode is activated for inputting a user identification code and a user password. The storage area corresponding to the specific user cannot be identified and accessed unless the input user identification code and the input user password are authenticated. Thereby, the data stored in the storage area corresponding to the specific user can be effectively protected. Moreover, according to the memory storage device, the memory controller, and the data protecting method described in an exemplary embodiment of the invention, the storage area corresponding to the specific user is further encrypted by the key, and the accessed data cannot be decrypted by the key unless the input user identification code and the input user password are authenticated. As such, data security can be further guaranteed. In addition, according to the memory storage device, the memory controller, and the data protecting method described in the exemplary embodiments of the invention, after the password authentication procedure is passed, the host system is required to be re-booted, such that BIOS can re-identify new configuration information. As a result, the compatibility issue does not occur when the storage area is changed. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data protecting method for a rewritable non-volatile memory module, wherein the rewritable non-volatile memory module has at least a first storage area and a second storage area, the data protecting method comprising:

providing default configuration information and pre-boot codes stored in the first storage area in response to a boot command from a host system, wherein the host system is unable to recognize the second storage area according to the default configuration information, and the pre-boot codes are executed in the host system;

receiving a user identification code and a user password from the host system;

determining whether the user identification code and the user password are respectively identical to a first identification code and a first password; and if the user identification code and the user password are respectively identical to the first identification code and the first password, transmitting a re-boot command to re-boot the host system, and providing first configuration information to the host system after re-booting the host system, wherein the host system recognizes the second storage area according to the first configuration information and accesses data stored in the second storage area.

2. The data protecting method according to claim 1, wherein the step of providing the default configuration information and the pre-boot codes stored in the first storage area in response to the boot command from the host system comprises:

reading encrypted pre-boot codes from the first storage area;

decrypting the encrypted pre-boot codes with a default boot key to obtain the pre-boot codes; and transmitting the pre-boot codes to the host system.

3. The data protecting method according to claim 1, wherein the step of receiving the user identification code and the user password from the host system comprises:

receiving an encrypted user data from the host system; and decrypting the encrypted user data to obtain the user identification code and the user password.

4. The data protecting method according to claim 1, further comprising:

generating a first identification code digest corresponding to the first identification code according to a first one-way hash function;

generating a first password digest corresponding to the first password according to a second one-way hash function;

encrypting a first key with the first password to generate a first ciphertext; and storing the first identification code digest, the first password digest, and the first ciphertext into a secured area of the rewritable non-volatile memory module.

5. The data protecting method according to claim 4, wherein the step of determining whether the user identification code and the user password are respectively identical to the first identification code and the first password comprises:

generating a user identification code digest corresponding to the user identification code according to the first one-way hash function;

generating a user password digest corresponding to the user password according to the second one-way hash function;

reading the first identification code digest and the first password digest from the secured area of the rewritable non-volatile memory module; and determining whether the user identification code digest and the user password digest are respectively identical to the first identification code digest and the first password digest;

if the user identification code digest and the user password digest are respectively identical to the first identification code digest and the first password digest, recognizing that the user identification code and the user password are respectively identical to the first identification code and the first password;

if the user identification code digest is different from the first identification code digest, outputting an identification code error message; and if the user password digest is different from the first password digest, outputting a password error message.

6. The data protecting method according to claim 5, further comprising:

if the user identification code digest and the user password digest are respectively identical to the first identification code digest and the first password digest, decrypting the first ciphertext with the user password to obtain the first key; and decrypting data read from the second storage area with the first key.

7. The data protecting method according to claim 1, wherein the rewritable non-volatile memory module further has a third storage area, and the host system is unable to recognize the third storage area according to the default configuration information.

8. The data protecting method according to claim 7, further comprising:

determining whether the user identification code and the user password are respectively identical to a second identification code and a second password; and if the user identification code and the user password are respectively identical to the second identification code and the second password, transmitting the re-boot command to re-boot the host system, and providing second configuration information to the host system after re-booting the host system, wherein the host system recognizes the third storage area according to the second configuration information.

9. The data protecting method according to claim 1, wherein the user identification code and the user password are input through the pre-boot codes executed in the host system.

10. A memory controller for controlling a rewritable non-volatile memory module and comprising:

a host interface configured to couple to a host system;

a memory interface configured to couple to the rewritable non-volatile memory module, wherein the rewritable non-volatile memory module has at least a first storage area and a second storage area; and a memory management circuit coupled to the host interface and the memory interface and configured to provide default configuration information and pre-boot codes stored in the first storage area in response to a boot command from the host system, wherein the host system is unable to recognize the second storage area according to the default configuration information, and the pre-boot codes are executed in the host system, wherein the memory management circuit is further configured to receive a user identification code and a user password from the host system and determine whether the user identification code and the user password are respectively identical to a first identification code and a first password, wherein if the user identification code and the user password are respectively identical to the first identification code and the first password, the executed pre-boot codes transmit a re-boot command to re-boot the host system, and the memory management circuit provides first configuration information to the host system after re-booting the host system, wherein the host system recognizes the second storage area according to the first configuration information and accesses data stored in the second storage area.

11. The memory controller according to claim 10, wherein the memory management circuit reads encrypted pre-boot codes from the first storage area, decrypts the encrypted pre-boot code with a default boot key to obtain the pre-boot codes, and transmits the pre-boot codes to the host system.

12. The memory controller according to claim 10, wherein the memory management circuit receives an encrypted user data from the host system and decrypts the encrypted user data to obtain the user identification code and the user password.

13. The memory controller according to claim 10, wherein the memory management circuit generates a first identification code digest corresponding to the first identification code according to a first one-way hash function, generates a first password digest corresponding to the first password according to a second one-way hash function, encrypts a first key with the first password to generate a first ciphertext, and stores the first identification code digest, the first password digest, and the first ciphertext into a secured area of the rewritable non-volatile memory module.

14. The memory controller according to claim 13, wherein the memory management circuit generates a user identification code digest corresponding to the user identification code according to the first one-way hash function, generates a user password digest corresponding to the user password according to the second one-way hash function, reads the first identification code digest and the first password digest from the secured area of the rewritable non-volatile memory module, and determines whether the user identification code digest and the user password digest are respectively identical to the first identification code digest and the first password digest, wherein if the user identification code digest and the user password digest are respectively identical to the first identification code digest and the first password digest, the memory management circuit recognizes that the user identification code and the user password are respectively identical to the first identification code and the first password, wherein if the user identification code digest is different from the first identification code digest, the memory management circuit outputs an identification code error message, wherein if the user password digest is different from the first password digest, the memory management circuit outputs a password error message.

15. The memory controller according to claim 14, wherein if the user identification code digest and the user password digest are respectively identical to the first identification code digest and the first password digest, the memory management circuit decrypts the first ciphertext with the user password to obtain the first key, wherein the memory management circuit decrypts data read from the second storage area with the first key.

16. The memory controller according to claim 10, wherein the rewritable non-volatile memory module further has a third storage area, and the host system is unable to recognize the third storage area according to the default configuration information, wherein the memory management circuit determines whether the user identification code and the user password are respectively identical to a second identification code and a second password, wherein if the user identification code and the user password are respectively identical to the second identification code and the second password, the executed pre-boot codes transmit the re-boot command to re-boot the host system, and the memory management circuit provides second configuration information to the host system after re-booting the host system, wherein the host system recognizes the third storage area according to the second configuration information.

17. The memory controller according to claim 10, wherein the pre-boot codes executed in the host system display an input interface to require a user to input the user identification code and the user password and transmit the user identification code and the user password to the memory management circuit.

18. A memory storage device comprising:
a connector configured to couple to a host system;
a rewritable non-volatile memory module having at least a first storage area and a second storage area; and
a memory controller coupled to the connector and the rewritable non-volatile memory module and configured to provide default configuration information and pre-boot codes stored in the first storage area in response to a boot command from the host system, wherein the host system is unable to recognize the second storage area according to the default configuration information, and the pre-boot codes are executed in the host system,
wherein the memory controller is further configured to receive a user identification code and a user password from the host system and determine whether the user identification code and the user password are respectively identical to a first identification code and a first password,
wherein if the user identification code and the user password are respectively identical to the first identification code and the first password, the executed pre-boot codes transmit a re-boot command to re-boot the host system, and the memory controller provides first configuration information to the host system after re-booting the host system, wherein the host system recognizes the second storage area according to the first configuration information and accesses data stored in the second storage area.

19. The memory storage device according to claim 18, wherein the memory controller reads encrypted pre-boot codes from the first storage area, decrypts the encrypted pre-boot codes with a default boot key to obtain the pre-boot codes, and transmits the pre-boot codes to the host system.

20. The memory storage device according to claim 18, wherein the memory controller receives an encrypted user data from the host system and decrypts the encrypted user data to obtain the user identification code and the user password.

21. The memory storage device according to claim 18,
wherein the memory controller generates a first identification code digest corresponding to the first identification code according to a first one-way hash function, generates a first password digest corresponding to the first password according to a second one-way hash function, encrypts a first key with the first password to generate a first ciphertext, and stores the first identification code digest, the first password digest, and the first ciphertext into a secured area of the rewritable non-volatile memory module.

22. The memory storage device according to claim 21, wherein the memory controller generates a user identification code digest corresponding to the user identification code according to the first one-way hash function, generates a user password digest corresponding to the user password according to the second one-way hash function, reads the first identification code digest and the first password digest from the secured area of the rewritable non-volatile memory module, and determines whether the user identification code digest and the user password digest are respectively identical to the first identification code digest and the first password digest.
wherein if the user identification code digest and the user password digest are respectively identical to the first identification code digest and the first password digest, the memory controller recognizes that the user identification code and the user password are respectively identical to the first identification code and the first password,
wherein if the user identification code digest is different from the first identification code digest, the memory controller outputs an identification code error message,
wherein if the user password digest is different from the first password digest, the memory controller outputs a password error message.

23. The memory storage device according to claim 21, wherein if the user identification code digest and the user password digest are respectively identical to the first identification code digest and the first password digest, the memory controller decrypts the first ciphertext with the user password to obtain the first key,
wherein the memory controller decrypts data read from the second storage area with the first key.

24. The memory storage device according to claim 18, wherein the rewritable non-volatile memory module further has a third storage area, and the host system is unable to recognizes the third storage area according to the default configuration information,
wherein the memory controller determines whether the user identification code and the user password are respectively identical to a second identification code and a second password,
wherein if the user identification code and the user password are respectively identical to the second identification code and the second password, the executed pre-boot codes transmit the re-boot command to re-boot the host system, and the memory controller provides second configuration information to the host system after re-booting the host system, wherein the host system recognizes the third storage area according to the second configuration information.

25. The memory storage device according to claim 18, wherein the pre-boot codes executed in the host system display an input interface to require a user to input the user identification code and the user password and transmit the user identification code and the user password to the memory controller.

* * * * *